United States Patent
Goto et al.

(10) Patent No.: US 7,463,346 B2
(45) Date of Patent: Dec. 9, 2008

(54) OPTICAL FIBER BIREFRINGENCE MEASUREMENT METHOD AND MEASUREMENT DEVICE, AND OPTICAL FIBER POLARIZATION MODE DISPERSION MEASUREMENT METHOD AND OPTICAL FIBER

(75) Inventors: Ryuichiro Goto, Sakura (JP); Shoichiro Matsuo, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/870,246

(22) Filed: Oct. 10, 2007

(65) Prior Publication Data

US 2008/0030720 A1    Feb. 7, 2008

Related U.S. Application Data

(63) Continuation of application No. PCT/JP2006/307927, filed on Apr. 14, 2006.

(30) Foreign Application Priority Data

Apr. 14, 2005 (JP) .............................. 2005-117030
Aug. 8, 2005 (JP) .............................. 2005-229263

(51) Int. Cl.
    G01N 21/00 (2006.01)
(52) U.S. Cl. .................................................... 356/73.1
(58) Field of Classification Search ................. 356/73.1
    See application file for complete search history.

(56) References Cited

U.S. PATENT DOCUMENTS 6,946,646 B2 *  9/2005  Chen et al. ............. 250/227.17

(Continued)

FOREIGN PATENT DOCUMENTS

JP    2002-48680 A    2/2002

(Continued)

OTHER PUBLICATIONS

Tomioka et al., "Fiber Evaluation by round-trip PMD based on Jones Matrix Eigenanalysis and Spatial Frequency Spectrum with OTDR Polarimetry", Jul. 2002, Seventh Optoelectronics and Communications Conference Technical Digest, pp. 488-489.*

(Continued)

*Primary Examiner*—Kara E Geisel
(74) *Attorney, Agent, or Firm*—Sughrue Mion, PLLC

(57) ABSTRACT

In a method of measurement of the birefringence of an optical fiber, the round-trip Jones matrix $R(z)$ for a first interval $(0, z)$ from a measurement starting point 0 in the optical fiber for measurement to a prescribed position z, and the round-trip Jones matrix $R(z+\Delta z)$ for a second interval $(0, z+\Delta z)$ from the measurement starting point 0 to a position $z+\Delta z$ differing from the position z, are acquired, the eigenvalues $\rho_1$, $\rho_2$ of the matrix $R(z+\Delta z)R(z)^{-1}$ are determined, and by computing the following equations (1) and (2), $$\phi = \frac{\arg\left(\frac{\rho_1}{\rho_2}\right)}{2} \quad (1)$$

$$\Delta n = \frac{\lambda \phi}{2\pi \cdot \Delta z} \quad (2)$$

(where $\phi$ represents the phase difference between linear polarization components due to birefringence, $\Delta n$ represents birefringence, and $\lambda$ represents wavelength), the birefringence in the infinitesimal interval $\Delta z$ from the position z to the position $z+\Delta z$ is obtained.

17 Claims, 9 Drawing Sheets

U.S. PATENT DOCUMENTS

| | | | |
|---|---|---|---|
| 2001/0022883 A1* | 9/2001 | Montmorillon et al. | 385/123 |
| 2002/0028051 A1* | 3/2002 | Bickham et al. | 385/123 |
| 2002/0085195 A1* | 7/2002 | Allen et al. | 356/73.1 |
| 2004/0136636 A1 | 7/2004 | Rogers | |

FOREIGN PATENT DOCUMENTS

| | | |
|---|---|---|
| JP | 2002-338140 A | 11/2002 |
| JP | 2004-525388 A | 8/2004 |
| JP | 2005-283136 A | 10/2005 |
| WO | WO 2004/010098 A1 | 1/2004 |
| WO | WO 2004/045113 A2 | 5/2004 |

OTHER PUBLICATIONS

Ishii et al., "Precise Determination of Local Birefringence of Optical Fibers by Long-Period Fiber Grating Analysis", 2002, OFC, pp. 686-688.*

Tanigawa, et al., "Henpa OTDR o Mochiita Fiber Nagate Hoko PMD no Hyokaho (Evaluation of Longitudinal PMD Distribution along Optical Fibers Using Polarization OTDR)", IEICE Technical Report, 2003, pp. 41-46, vol. 103, No. 91.

Rogers, et al., "Computational Polarization—optical time domain reflectometry for measurement of the spatial distribution of PMD in optical fibres", OFMC '97. 4$^{th}$ Optical Fibre Measurement Conference. Conference Digest, 1997, pp. 126-129.

E. Chausse et al., "POTDR, depolarization and detection of sections with large PMD", OFMC 95'.

Tadao Tsuruta, Ouyou Kougaku 2, pp. 197-200, published by Baifukan Co., Ltd, no date.

R. Clark Jones, "A New Calculus for the treatment of Optical Systems VI. Experimental Determination of the Matrix", Journal of the Optical Society of America, vol. 37, No. 2, pp. 110-112, 1947.

N. Gisin et al., "How Accurately Can One Measure a Statistical Quantity Like Polarization-Mode Dispersion?", IEEE Photonics Technology Letters, vol. 8, No. 12, pp. 1671-1673, Dec. 1996.

B.L. Heffner, "Automated Measurement of Polarization Mode Dispersion Using Jones Matrix Eigenanalysis", IEEE Photonics Technology Letters, vol. 4, No. 9, pp. 1066-1069, Dec. 1992.

* cited by examiner

US 7,463,346 B2

OPTICAL FIBER BIREFRINGENCE MEASUREMENT METHOD AND MEASUREMENT DEVICE, AND OPTICAL FIBER POLARIZATION MODE DISPERSION MEASUREMENT METHOD AND OPTICAL FIBER

BACKGROUND OF THE INVENTION

1. Field of the Invention

This invention relates to a method of measurement of birefringence of an optical fiber and a measurement device, and to an optical fiber polarization mode dispersion measurement method and an optical fiber, and relates to techniques for the precise and simple measurement of the birefringence and polarization mode dispersion of an optical fiber along the length direction.

This application relates to and claims priority from Japanese Patent Application No. 2005-117030, filed on Apr. 14, 2005, and from Japanese Patent Application No. 2005-229263, filed on Aug. 8, 2005, the entire disclosures of which are incorporated herein by reference.

2. Description of the Related Art

In recent years, the faster transmission rates and longer transmission distances of optical communications have been accompanied by a need to reduce polarization mode dispersion (hereafter "PMD") along transmission paths. PMD is dispersion which occurs due to group velocity differences among two eigenpolarization components which are orthogonal, propagating in an optical fiber (see Patent References 1 and 2 and Non-patent References 1 to 5).

There are two parameters determining the PMD. One is the magnitude of birefringence in the optical fiber; the other is the magnitude of the polarization mode coupling, which indicates changes in the optical fiber length direction of the birefringent axis in the optical fiber.

Specific factors determining PMD in an optical cable transmission path include ellipticity of the fiber core, asymmetry or the like of stresses occurring in the core, and other factors arising within the optical fiber, as well as asymmetry of stresses due to optical fiber bending in optical cable manufacturing processes and other factors arising from processes to produce optical cable. Hence in order to prevent worsening of PMD in optical cables due to factors within optical fibers, it is desirable that PMD arising from factors within the optical fiber be measured before processes to manufacture optical cable, and that optical fibers with poor PMD characteristics be excluded.

Optical fiber is normally wound on a bobbin for transport to the site of the process for optical cable manufacture. But an optical fiber wound on a bobbin is subject to bending and to birefringence caused by lateral pressure while wound on the bobbin; in addition, optical fibers will come into contact with each other or will be subjected to considerable torsion while being taken up on the bobbin, so that polarization mode coupling is induced. Consequently the PMD of an optical fiber wound on a bobbin does not coincide with the PMD arising from factors within the optical fiber.

Hence in order to measure PMD arising from factors within the optical fiber, a method is employed in which the optical fiber is removed from the bobbin and is wound with a diameter of from 20 cm to 100 cm, and by immersing the fiber in a liquid having a specific gravity close to that of the optical fiber, birefringence arising from lateral pressure and small-radius bending, as well as polarization mode coupling arising from contact between optical fibers, are eliminated, and the PMD is measured. This PMD measurement is for example described in Non-patent Reference 5.

As is stated in Non-patent Reference 4, PMD has statistical properties, and so measurements are attended by uncertainty. In order to reduce this uncertainty, methods may be used to increase the total PMD of the optical fiber for measurement, or expand the wavelengths for measurement, or apply perturbations to the optical fiber being measured and perform measurements a plurality of times.

Patent Reference 1: International Patent Publication No. WO 2004/010098

Patent Reference 2: International Patent Publication No. WO 2004/045113

Non-patent Reference 1: E. Chausse, N. Gisin, Ch. Zimmer, "POTDR, depolarization and detection of sections with large PMD", OFMC '95.

Non-patent Reference 2: Tadao Tsuruta, *Ouyou Kougaku* 2, pp. 197-200, BAIFUKAN CO., LTD.

Non-patent Reference 3: R. C. Jones, "A new calculus for the treatment of optical systems VI. Experimental determination of the matrix", JOSA, Vol. 37, pp. 110-112, 1947.

Non-patent Reference 4: N. Gisin, "How accurately can one measure a statistical quantity like polarization-mode dispersion", PTL, Vol. 8, No. 12, pp. 1671-1673, December 1996.

Non-patent Reference 5: B. L. Heffner, "Automated measurement of polarization mode dispersion using Jones matrix eigenanalysis", IEEE Photonics Tech. Lett. Vol. 4, No. 9, September 1992.

However, there are the following problems with the PMD measurement methods of the prior art.

In order to increase the total PMD of the optical fiber for measurement, the total length of the optical fiber for measurement must be made long if the optical fiber for measurement has a small PMD; but because an optical fiber used in PMD measurements in the free state cannot again be used as a product, this method requires a long optical fiber each time a measurement is performed, so that waste is substantial. Further, methods entailing expansion of the wavelengths for measurement are subject to constraints imposed by the operating wavelengths of the light source, and so there are limits to the use of such methods. And, methods requiring a plurality of measurements require time to perform measurements and are inefficient.

Next, another technology of the prior art, and problems with this technology, are described. Because there are large fluctuations in PMD depending on the preform and drawing conditions of the optical fiber, normally optical fibers manufactured under identical conditions exhibit substantially the same PMD value, but due to unanticipated causes, there are cases of partial worsening of the PMD, and so it is desirable that length-direction measurements be performed.

Methods of the prior art for longitudinal measurement of the birefringence and PMD include the methods described in Patent References 1 and 2. These methods involve measurement of the birefringence and PMD based on the amount of scattering in the OTDR waveform observed when a polarizer is placed between the OTDR and the optical fiber for measurement. However, these measurement methods are accompanied by a number of problems.

First, in methods of the prior art, the waveform amplitude differs depending on the incident polarization state and on the birefringence axis angle of the optical fiber, and so there is the problem that measurements cannot be performed accurately. For example, when the incident polarization is linear polarization, the amplitude is maximum when the angle between the direction of linear polarization and the birefringence axis is 45°, but when the two directions coincide, the amplitude is zero. This problem has a serious impact on the results of measurement of polarization mode dispersion using conventional methods.

Further, in methods of the prior art, scattering from the least-square approximating line is used as an index of the scattering in the OTDR waveform; to this end, averaging must be performed over a certain interval, and so it is inherently not possible to obtain a high resolution.

Moreover, a feature of methods of the prior art is the simple configuration obtained by using a general-purpose OTDR; but because the light source of a general-purpose OTDR has a broad spectral width from 5 nm to 20 nm, once a point with large PMD is traversed, a phenomenon occurs in which the polarization state of the pulse differs with the wavelength, and so the amplitude is averaged and becomes smaller; hence there is the problem that subsequent PMD measurements cannot be performed (see Non-patent Reference 1).

SUMMARY OF THE INVENTION

This invention was devised in light of the above circumstances, and has as an object the provision of a method of measurement, with accuracy and in a short length of time, of the birefringence and PMD of a short optical fiber having a comparatively small PMD in the free state and a device therefore.

A further object of this invention is the provision of a method and device for the accurate longitudinal measurement of birefringence and PMD of an optical fiber in the free state with arbitrary resolution, and such that even when a point with large PMD exists midway in the fiber, there is no influence on subsequent measurement results.

In order to attain the above objects, this invention provides a method of measurement of the birefringence of an optical fiber, in which the round-trip Jones matrix $R(z)$ for a first interval $(0, z)$ from a measurement starting point $0$ in the optical fiber for measurement to a prescribed position $z$, and the round-trip Jones matrix $R(z+\Delta z)$ for a second interval $(0, z+\Delta z)$ from the measurement starting point $0$ to a position $z+\Delta z$ differing from the position $z$, are acquired, the eigenvalues $\rho_1, \rho_2$ of the matrix $R(z+\Delta z)R(z)^{-1}$ are determined, and by computing the following equations (1) and (2), $$\phi = \frac{\arg\left(\frac{\rho_1}{\rho_2}\right)}{2} \quad (1)$$

$$\Delta n = \frac{\lambda \phi}{2\pi \cdot \Delta z} \quad (2)$$

(where $\phi$ represents the phase difference between linear polarization components due to birefringence, $\Delta n$ represents birefringence, and $\lambda$ represents wavelength), the birefringence in the infinitesimal interval $\Delta z$ from the position $z$ to the position $z+\Delta z$ is obtained.

In an optical fiber birefringence measurement method of this invention, it is preferable that a polarization OTDR be used to acquire the round-trip Jones matrices of the optical fiber for measurement.

Further, this invention provides an optical fiber birefringence measurement device, having timing control means; pulse light generation means, controlled by the timing control means; polarization conversion means which converts pulse light from the pulse light generation means into a polarized state; optical recirculation means which inputs pulse light from the polarization conversion means to one end of the optical fiber for measurement, and which outputs backscattered light returning to one end of the optical fiber for measurement; polarization detection means, controlled by the timing control means, which detects the polarization state of light output from the optical recirculation means as a time series; and analysis means, which, based on the output of the polarization detection means, uses the birefringence measurement method to measure the birefringence of the optical fiber for measurement.

Further, this invention provides an optical fiber polarization mode dispersion measurement method, in which the birefringence of the optical fiber for measurement in the free state, measured using the optical fiber birefringence method, and the relation to the polarization mode dispersion of the optical fiber for measurement in the free state, are used to measure the polarization mode dispersion of the optical fiber for measurement in the free state.

Further, this invention provides an optical fiber polarization mode dispersion measurement method, in which a portion of an optical fiber wound onto a bobbin is removed, and after using the optical fiber polarization mode dispersion measurement method to measure the polarization mode dispersion, the measured value of the polarization mode dispersion is taken to be the polarization mode dispersion when the entire optical fiber wound around the bobbin is placed into the free state.

Further, this invention provides an optical fiber polarization mode dispersion measurement method, in which the birefringence of the optical fiber for measurement in the free state, measured using the optical fiber birefringence measurement method, and the relation to the polarization mode dispersion of the optical fiber for measurement in the free state, are used to measure the polarization mode dispersion of the optical fiber for measurement in the free state, while in the state of being wound around a bobbin.

Further, this invention provides an optical fiber polarization mode dispersion measurement method, in which the birefringence of the optical fiber for measurement in the state of being wound around a bobbin, measured using the optical fiber birefringence measurement method, and the relation to the polarization mode dispersion of the optical fiber for measurement in the free state, are used to measure the polarization mode dispersion of the optical fiber for measurement in the free state, while in the state of being wound around the bobbin.

In the polarization mode dispersion measurement method, the amount of twist applied to the optical fiber for measurement in the state of being wound around the bobbin may be 1 rad/m or less.

In the polarization mode dispersion measurement method, the birefringence may be measured for a portion in which the effects of the tension of takeup on the bobbin and of lateral pressure due to the taken-up optical fiber itself are small, and this birefringence of the optical fiber for measurement may be used as a representative value, and used as the polarization mode dispersion of the optical fiber when the entire optical fiber wound around the bobbin is placed in the free state.

In the polarization mode dispersion measurement method, cushion material may be positioned at a place at which the optical fiber for measurement is in contact with the bobbin around which the optical fiber is wound, to reduce lateral pressure on the optical fiber, and in addition the effect of polarization state fluctuations during measurements arising from expansion and shrinkage of the bobbin due to temperature changes in the measurement environment may be eliminated.

In the polarization mode dispersion measurement method, upon temporarily relaxed the tension of the optical fiber, the birefringence of the optical fiber for measurement may be measured while in the state of being wound around the bobbin, and the polarization mode dispersion of the optical fiber in the free state may be measured.

Further, this invention provides an optical fiber the polarization mode dispersion of which, as measured by the above optical fiber polarization mode dispersion measurement method, is 0.1 ps/$\sqrt{km}$ or less.

In this optical fiber, the amount of twist applied, in the state of being wound around the bobbin, may be 1 rad/m or less.

In this optical fiber, the value of, or the upper limit of, the measured polarization mode dispersion may be displayed.

According to this invention, the round-trip Jones matrix R(z) for a first interval (0,z) from a measurement starting point 0 in the optical fiber for measurement to a prescribed position z and the round-trip Jones matrix R(z+Δz) for a second interval (0, z+Δz) from the measurement starting point 0 to a position z+Δz differing from the position z in the optical fiber for measurement are acquired, the eigenvalues $\rho_1$, $\rho_2$ of the matrix R(z+Δz)R(z)$^{-1}$ are determined, and the birefringence of the infinitesimal interval Δz is obtained by calculation, and, the PMD of the optical fiber is obtained from the optical fiber birefringence thus obtained, so that a method and device for the accurate measurement, in a short length of time, of the birefringence and PMD of a short optical fiber, in the free state and having comparatively small PMD, can be provided.

Further, this invention can provide a method and device to measure, accurately and with arbitrary resolution, the length-direction birefringence and PMD of an optical fiber in the free state, and moreover even when a point with large PMD exists midway in the fiber, there is no influence on subsequent measurement results.

Further, by means of this invention the PMD of an optical fiber in the free state can be estimated for the optical fiber in the state of being wound around a bobbin, or in a state of being wound around a bobbin with the tension temporarily relaxed.

BEST MODE FOR CARRYING OUT THE INVENTION

Figure 1:
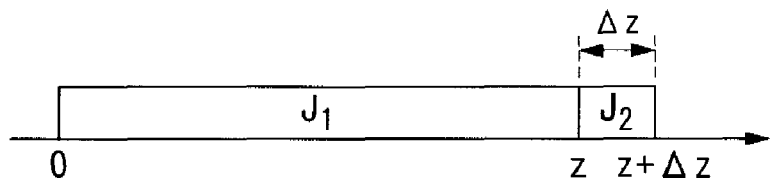
FIG. 1 is a summary diagram to explain the measurement interval in an optical fiber birefringence measurement method of this invention.

Below, preferred embodiments of the invention are explained, referring to the drawings. However, the invention is not limited to the following embodiments, and for example constituent elements of these embodiments may be appropriately combined.

First, a method of measurement of birefringence of an optical fiber according to this invention is explained.

FIG. 1 is a summary diagram to explain the measurement interval in an optical fiber birefringence measurement method of this invention. In the birefringence measurement method of the invention, a first interval (0, z) is set from a measurement starting point 0 to a prescribed position z in the optical fiber for measurement, and a second interval (0, z+Δz) from the measurement starting point 0 to a position z+Δz different from the position z is set; the interval from the position z to the position z+Δz (the interval which is the difference between the first interval and the second interval) is the infinitesimal interval Δz.

Further, if the one-way Jones matrix for the first interval ($\mathbf{0}$, z) is $J_1$, the one-way Jones matrix for the infinitesimal interval Δz is $J_2$, and the round-trip Jones matrix for the first interval (0, z) is R (z), then the relation of the following equation (3) obtains.

$$R(z) = J_1^T J_1 \quad (3)$$

Here, upon considering the matrix $R(z+\Delta z)R(z)^{-1}$, the following equation (4) is obtained.

$$R(z+\Delta z)R(z)^{-1} = J_1^T J_2^T J_2 J_1 \cdot (J_1^T J_1)^{-1} \quad (4)$$
$$= J_1^T J_2^T J_2 J_1 \cdot J_1^{-1} (J_1^T)^{-1}$$
$$= J_1^T J_2^T J_2 (J_1^T)^{-1}$$

In optical fiber in the free state and in optical fiber within optical cable, changes in the birefringence axis of the optical fiber and torsion applied to the optical fiber are gradual, and so the infinitesimal interval Δz can be regarded as having only a linear birefringence, and the birefringence axis angle can also be regarded as constant. Then the one-way Jones matrix $J_2$ for the infinitesimal interval Δz is given by the following equation (5), where the angle of the fast axis of birefringence is θ and the phase difference between orthogonal polarization due to birefringence is φ.

$$J_2 = P_2 Q_2 P_2^{-1} \quad (5)$$
$$= \begin{bmatrix} \cos\theta & -\sin\theta \\ \sin\theta & \cos\theta \end{bmatrix} \cdot \begin{bmatrix} \exp(+\phi/2) & 0 \\ 0 & \exp(-\phi/2) \end{bmatrix} \cdot \begin{bmatrix} \cos\theta & \sin\theta \\ -\sin\theta & \cos\theta \end{bmatrix}$$

(In equation (5), $P_2$ is a matrix the components of which are eigenvectors of the matrix $J_2$, and $Q_2$ is a diagonal matrix the diagonal components of which are eigenvalues of the matrix $J_2$.) Hence the following equation (6) obtains.

$$P_2^{-1} = P_2^T \quad (6)$$

In this case, the following equation (7) results.

$$R(z+\Delta z)R(z)^{-1} = J_1^T J_2^T J_2 (J_1^T)^{-1} \quad (7)$$
$$= J_1^T (P_2 Q_2 P_2^{-1})^T P_2 Q_2 P_2^{-1} (J_1^T)^{-1}$$
$$= J_1^T (P_2^{-1})^T Q_2^T P_2^T P_2 Q_2 P_2^{-1} (J_1^T)^{-1}$$
$$= J_1^T (P_2^T)^{-1} Q_2 P_2^{-1} P_2 Q_2 P_2^{-1} (J_1^T)^{-1}$$
$$= J_1^T P_2 Q_2 Q_2 P_2^{-1} (J_1^T)^{-1}$$
$$= (J_1^T P_2) \cdot Q_2^2 \cdot (J_1^T P_2)^{-1}$$

On the other hand, upon diagonalization, $R(z+\Delta z)R(z)^{-1}$ can be expressed as in equation (8).

$$R(z+\Delta z)R(z)^{-1} = P'Q'(P')^{-1} \quad (8)$$

Therefore the following equation (9) obtains.

$$P' = J_1^T P_2$$
$$Q' = Q_2^2 \quad (9)$$

Hence it is seen that the diagonal matrix Q' obtained by diagonalizing the matrix $R(z+\Delta z)R(z)^{-1}$ is the square of the diagonal matrix $Q_2$ obtained by diagonalizing the Jones matrix $J_2$ for the infinitesimal interval (z, z+Δz). That is, the following equation (10) obtains.

$$Q' = Q_2^2 = \begin{bmatrix} \exp(+\phi) & 0 \\ 0 & \exp(-\phi) \end{bmatrix} \quad (10)$$

The diagonal elements of Q' are eigenvalues of R (z+Δz) R $(z)^{-1}$, so that if the two eigenvalues $\rho_1$, $\rho_2$ of $R(z+\Delta z)R(z)^{-1}$ are given by equation (11), $$\rho_1 = \exp(\phi)$$
$$\rho_2 = \exp(-\phi) \quad (11)$$

then the following equations (12) and (13)

$$\phi = \frac{\arg\left(\frac{\rho_1}{\rho_2}\right)}{2} \quad (12)$$

$$\Delta n = \frac{\lambda \phi}{2\pi \cdot \Delta z} \quad (13)$$

can be used to obtain the measured birefringence of an arbitrary infinitesimal interval Δz, that is, the longitudinal birefringence.

By performing averaging processing of birefringence values measured in this way according to the required resolution, birefringence measurements with arbitrary resolution can be performed.

In computations of birefringence according to a birefringence measurement method of this invention, no constraints in particular are placed on the Jones matrix for the first interval (0,z), and so regardless of the properties of the Jones matrix for the first interval (0,z), there is no effect on measurements.

Next, an aspect of an optical fiber birefringence measurement device of this invention is explained, referring to the drawings.

Figure 2:
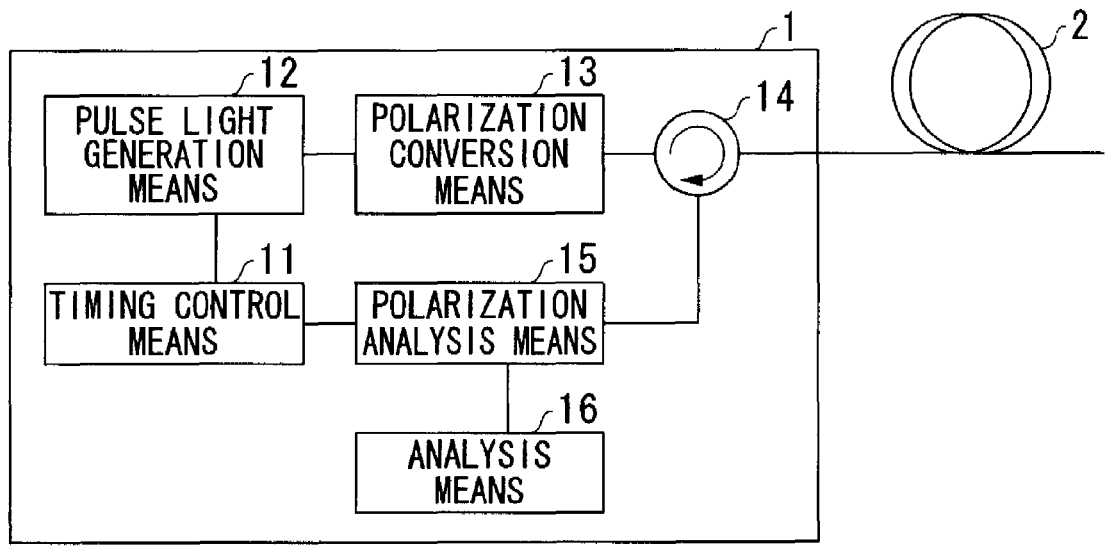
FIG. 2 is a configuration diagram of an aspect of an optical fiber birefringence measurement device of this invention.

FIG. 2 is a configuration diagram of an aspect of an optical fiber birefringence measurement device of this invention. The birefringence measurement device 1 of this aspect comprises timing control means 11; pulse light generation means 12, controlled by the timing control means 11; polarization conversion means 13, which converts the polarization state of pulse light from the pulse light generation means 12; optical recirculation means 14, which inputs pulse light from the polarization conversion means 13 to one end of the optical fiber for measurement, and which outputs backscattered light returning to one end of the optical fiber for measurement; polarization detection means 15, controlled by the timing control means 11, which detects the polarization state of light output from the optical recirculation means 14 as a time series; and analysis means 16, which, based on the output of the polarization detection means 15, uses the birefringence measurement method described above to measure the birefringence of the optical fiber for measurement 2.

In the birefringence measurement device 1 of this aspect, pulse light output from the pulse light generation means 12 controlled by the timing control means 11 is input to the polarization conversion means 13, and after conversion into three different polarization states, is output.

Pulse light output from the polarization conversion means 13 is input to one end of the optical fiber for measurement 2 from the optical recirculation means 14, and backscattered light returning to this end is input from the optical recirculation means 14 to the polarization analysis means 15, which is controlled by the timing control means 11, and the polarization state of the returning light is detected as time-series data.

In measurement of the polarization state, the intensities of four polarization components comprised by the returning light, which are the horizontal polarization component, vertical polarization component, 45° linear polarization component, and right-circular polarization component, are measured as time series, the Stokes parameters are computed, and fully polarized components are converted into Jones vectors (see Non-patent Reference 2). By performing these operations using time series, polarization states can be detected as time series.

The analysis means 16 measures the round-trip Jones matrix of the optical fiber for measurement 2 from the time-series data for polarization states of returning light, for the three types of polarization states resulting from conversion by the polarization conversion means 13. A method for computation of the Jones matrix from output polarized light for three different types of input polarized light is for example described in detail in Non-patent Reference 3.

Next, the configuration of the pulse light generation means 12 used in this birefringence measurement device 1 is described. The light source of a general-use OTDR has a broad spectral width of 5 nm to 20 nm, and so upon passing a point with large PMD, a phenomenon occurs in which the polarization states in the pulse differ with wavelength, and the amplitude is averaged and becomes smaller, so that there is the well-known problem that subsequent PMD can no longer be measured (see Non-patent Reference 1). Hence it is desirable that the pulse light output from the pulse light generation means 12 have a narrow spectral width.

However, as the spectral width of the pulse light is made narrow, another problem arises. As the spectral width becomes narrow, the light source coherence is increased, so that there is interference with backscattered light from different positions, appearing as substantial noise during OTDR measurements. This is called coherent noise.

Figure 3:
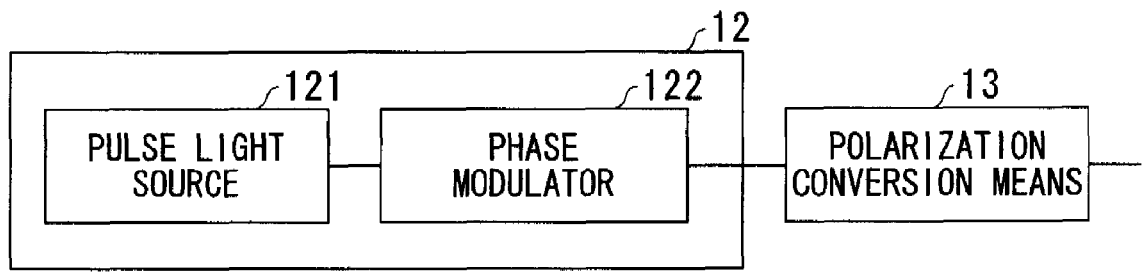
FIG. 3 is a configuration diagram showing an example of pulse light generation means of an optical fiber birefringence measurement device of this invention.

As one effective method to eliminate the effect of coherent noise on the OTDR waveform, a phase adjuster 122 which utilizes an electrooptic effect, acoustooptic effect or similar is placed in a stage beyond the pulse light source 121 of the pulse light generation means 12, as shown in FIG. 3, so that the spectral width of the pulse light source 121 is broadened sufficiently that changes in polarization state due to changes in wavelength can be ignored, reducing coherence. In addition, by placing a wavelength filter in a stage beyond the pulse light source 121 with a broad spectral width, changes in polarization state due to wavelength changes can be ignored, and similar advantageous results can be obtained even when the spectral width is narrowed to an extent such that coherence is not a problem.

The wavelength spectral width must be such that changes in polarization state due to wavelength changes at different points in the optical fiber for measurement 2 can be ignored; because this is determined by the magnitude of the cumulative PMD at each point in the optical fiber for measurement 2, the spectral width cannot be uniquely determined, but a spectral width of 0.1 nm is sufficient to eliminate coherent noise, and a larger width is unnecessary.

Figure 4:
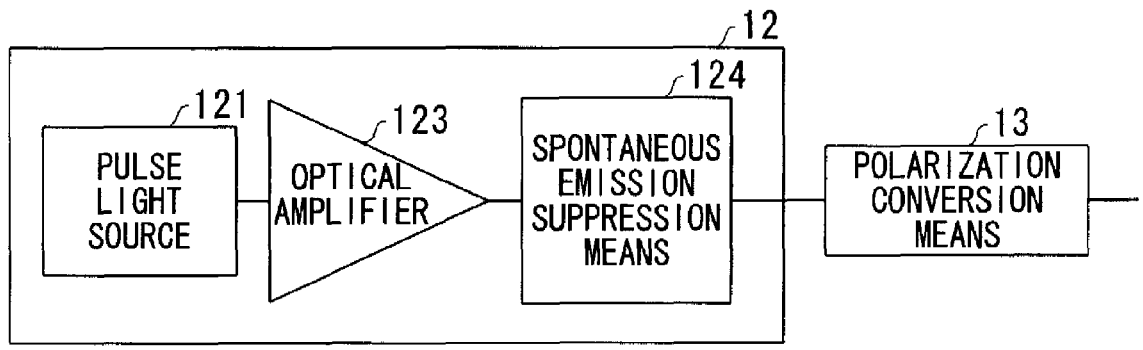
FIG. 4 is a configuration diagram showing another example of pulse light generation means of an optical fiber birefringence measurement device of this invention.

Next, another aspect of pulse light generation means 12 used in an optical fiber birefringence measurement device 1 of this invention is described. As shown in FIG. 4, if an optical amplifier 123 is positioned within the pulse light generation means 12, the pulse light is amplified, and so measurements can be performed over a longer distance. In this case, the optical amplifier 123 emits light spontaneously, and so it is preferable that spontaneous emission suppression means 124 be positioned in a stage beyond the optical amplifier 123, such that spontaneous emission is not input to the optical fiber for measurement 2 at times when pulses are not output. As the spontaneous emission suppression means, an acoustooptic modulator or other optical modulator can be used.

Figure 5:
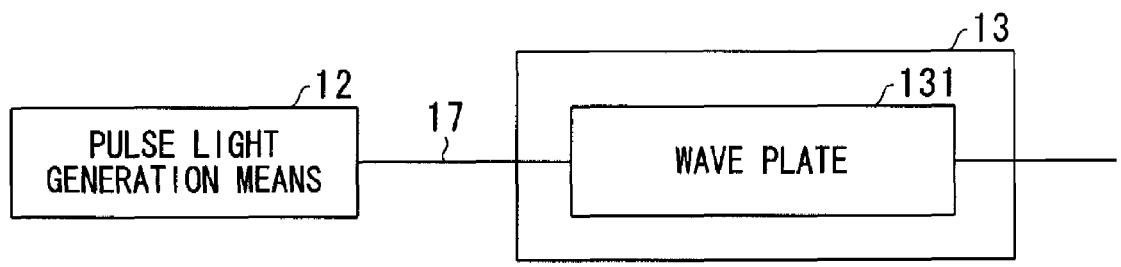
FIG. 5 is a configuration diagram showing an example of polarization conversion means of an optical fiber birefringence measurement device of this invention.

Next, the polarization conversion means 13 is described. The polarization conversion means 13 used in this invention must be able to form three different polarization states, and must be configured such that the polarization states formed can be ascertained. As shown in FIG. 5, when a wave plate 131 is used independently as the polarization conversion means, if the polarization state of light incident on the wave plate 131 changes, the emission light polarization state changes; hence it is desirable that the entire optical path from emission of linearly polarized light by the pulse light generation means 12 up to the polarization conversion means 13 be configured using polarization-maintaining components (polarization-maintaining optical fiber or other polarization-maintaining waveguides), so that the polarization state of light incident on the polarization conversion means 13 is kept constant.

Figure 6:
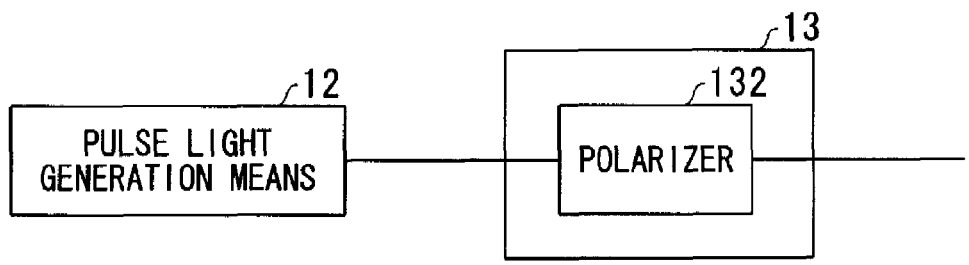
FIG. 6 is a configuration diagram showing another example of polarization conversion means of an optical fiber birefringence measurement device of this invention.
Figure 8:
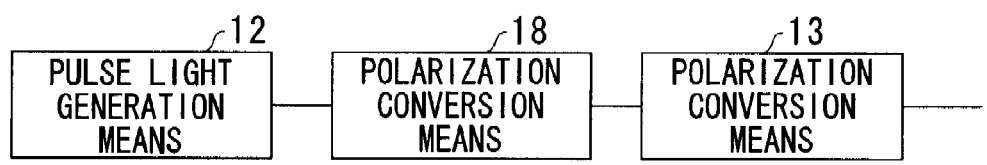
FIG. 8 is a configuration diagram showing another example of polarization conversion means of an optical fiber birefringence measurement device of this invention.

Next, another polarization conversion means 13 of this invention is described. As shown in FIG. 6, if a polarizer 132 is used as the polarization conversion means 13, then even when the polarization state of light incident on the polarization conversion means 13 is indefinite, the light emitted from the polarization conversion means 13 is linearly polarized light. Hence it is preferable that, by changing the angle of the polarizer 13, an arbitrary linearly polarized state can be created. Here, there are cases in which, by changing the angle of the polarizer 132, the emission power from the polarizer 132 is decreased according to the angle, and the SN ratio of OTDR measurements is lowered. Hence as shown in FIG. 8, it is preferable that another polarization conversion means 18 be positioned in a stage before the polarization conversion means 13, so that by changing the state of polarization of light input to the polarization conversion means 13, the emission power from the polarizer in the polarization conversion means 13 can be adjusted.

Figure 7:
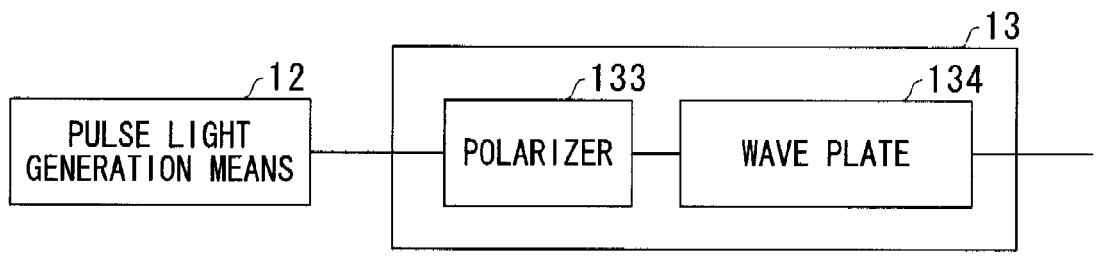
FIG. 7 is a configuration diagram showing another example of polarization conversion means of an optical fiber birefringence measurement device of this invention.

Next, still another polarization conversion means 13 of the invention is described. When a configuration is employed in which a polarizer 133 and a wave plate 134 placed in a later stage are used as the polarization conversion means 13, as shown in FIG. 7, even when the polarization state of light input to the polarization conversion means 13 is indefinite, the light output from the polarizer 13 is linearly polarized light, and a polarization state is created by the wave plate 134, which is preferable. In this case, it is preferable that a configuration be employed in which, by changing the angle of the polarizer 133 according to the state of polarization of light input to the polarization conversion means 13, the power output from the polarizer 133 can be adjusted. And, it is still more preferable that a configuration be employed in which another polarization conversion means 18 be placed in a stage before the polarization conversion means 13, so that by changing the polarization state of light input to the polarization conversion means 13, the power emitted from the polarizer in the polarization conversion means 13 can be adjusted.

Figure 9:
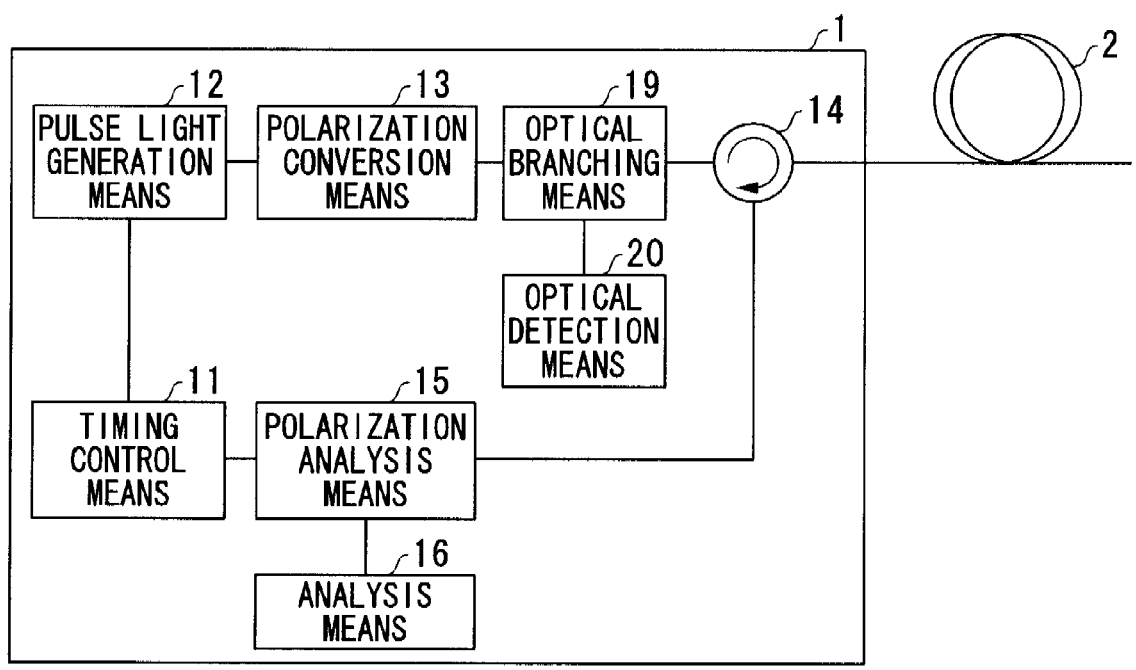
FIG. 9 is a configuration diagram showing another aspect of an optical fiber birefringence measurement device of this invention.

Next, another aspect of a birefringence measurement device of the invention is described. The polarization state of light passing through an optical fiber varies greatly when the optical fiber is subjected to bending, external forces, and other perturbations from outside. Hence when using polarizers 132, 133 in the polarization conversion means 13, if a perturbation is applied from outside during measurements in the optical path connecting the pulse light generation means 12 and the polarization conversion means 13, the quantities of light passing through the polarizers 132 and 133 in the polarization conversion means 13 change, and there is a large impact on the measurement results. Hence as shown in FIG. 9, it is preferable that optical branching means 19 and optical detection means 20 be placed in a stage beyond the polarization conversion means 13, that changes in the quantities of light passing through the polarizers 132 and 133 be measured, and that monitoring for the presence of the effect of perturbations be performed, as well as controlling the polarization conversion means 13 such that adequate pulse light intensity is always obtained.

Next, still another aspect of a birefringence measurement device of the invention is described. When similar perturbations are applied to the optical fiber for measurement 2 during measurements, the Jones matrix for the optical fiber changes, and there is an effect on the measurement results. Hence a method in which two or more measurements are performed for the same input polarization and the results are compared, to monitor whether perturbations have been applied to the optical fiber for measurement 2 during measurements, is effective. Specifically, a configuration can be employed in which, by incorporating the above-described measurement program into the analysis means 16, performing two or more measurements with the same input polarization, and comparing the results, it is possible to display whether perturbations have been applied to the optical fiber for measurement 2 during measurements. There may not be a need to perform two or more measurements for all three input polarizations; normally it is sufficient to perform two measurements with the same input polarization state at the beginning and at the end, and to compare the measurement results.

Next, a PMD measurement method of this invention is explained. A feature of a PMD measurement method of this invention is the determination of PMD in the optical fiber for measurement 2 based on the birefringence of the optical fiber for measurement 2 measured using an above-described birefringence measurement method of this invention.

As explained above, PMD is determined based on two factors, which are the local birefringence and polarization mode coupling. Hence when polarization mode coupling can be regarded as substantially constant, and when a fixed relation exists between the magnitude of local birefringence and polarization mode coupling, the value of polarization mode coupling can be measured using the local birefringence, and so the PMD value can be measured.

In general, the larger the birefringence of an optical fiber placed in the free state, the smaller is the polarization mode coupling, and the smaller the birefringence, the larger is the polarization mode coupling; hence there exists a fixed relation between the magnitude of the birefringence and the polarization mode coupling, and by determining this relation experimentally in advance, the PMD can be measured through the magnitude of the birefringence. This method is particularly effective when measuring the PMD in a short optical fiber in which the PMD in the free state is comparatively small.

Figure 13:
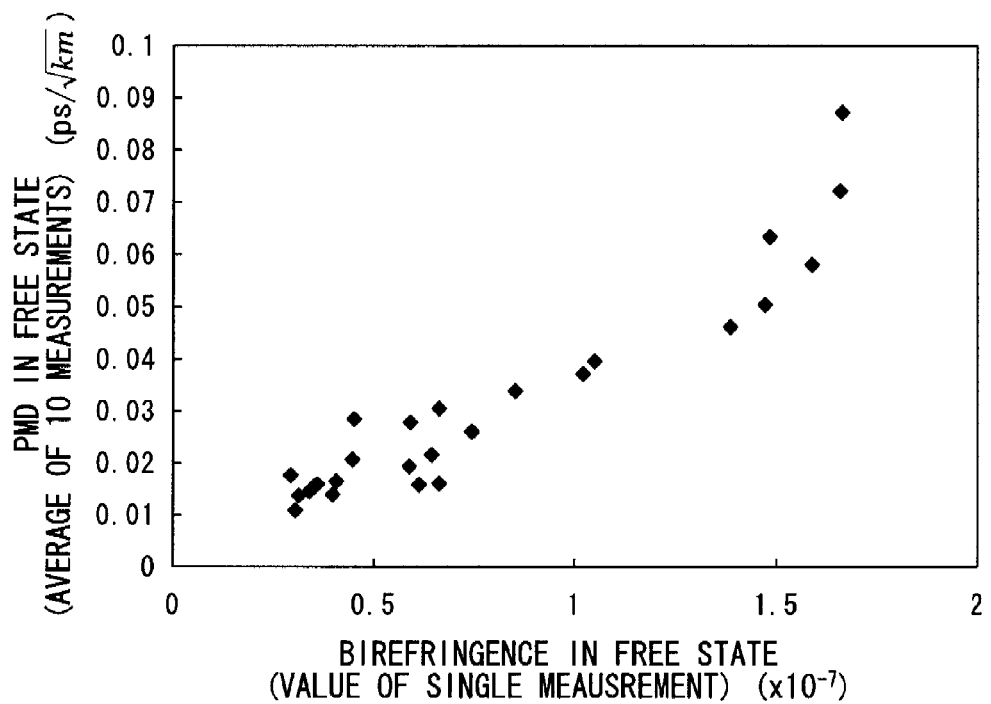
FIG. 13 compares the birefringence measured by a method of this invention with the measurement results for ten measurements of PMD by a conventional method.

An optical fiber of total length 3000 m was actually placed in the free state, and a measurement device of this invention was used to measure the birefringence at a wavelength of 1.55 μm. Then, the PMD of the optical fiber in the free state was measured for the 1.55 μm wavelength band; the results are compared in FIG. 13. The PMD measurement results of FIG. 13 were obtained by changing the installed state of the optical fiber upon each measurement, performing 10 measurements of the PMD with the optical fiber in the free state, and averaging the results.

Figure 14:
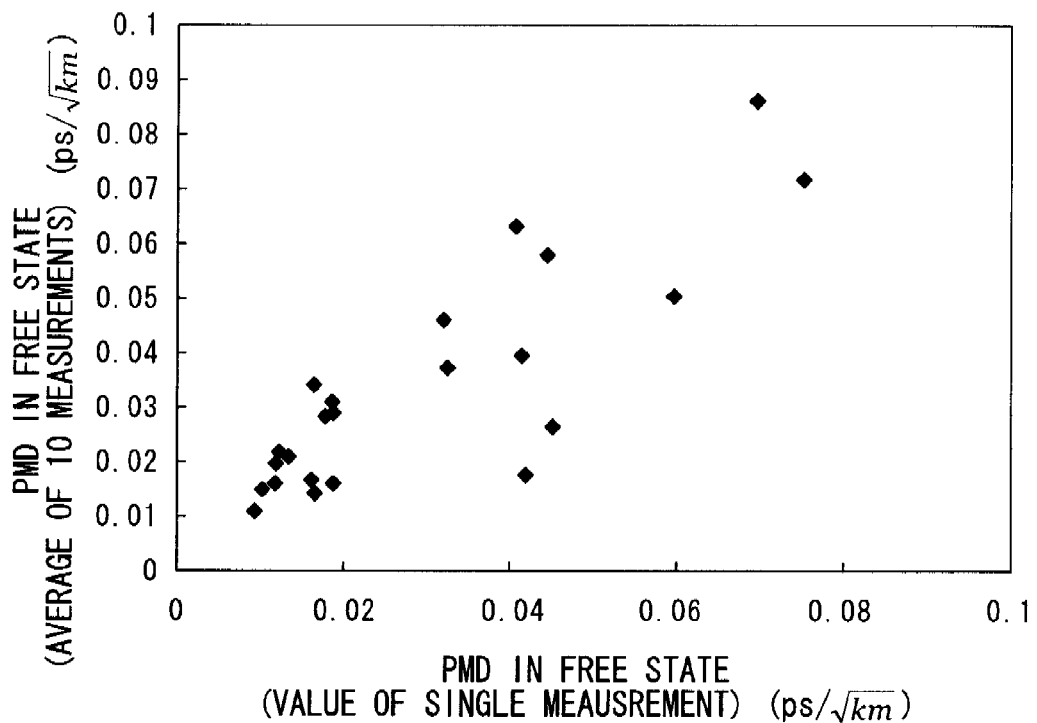
FIG. 14 compared the measurement results for a single measurement of PMD by a conventional method with the measurement results for ten measurements of PMD by the conventional method.

FIG. 14 compares one measurement result extracted from the ten results with the average of 10 measurements in the PMD measurements of the optical fiber in the free state. Due to the statistical nature of PMD, the average value of the 10 measurements is thought to be closer to the true value; but on comparing FIG. 13 and FIG. 14, it is seen that the results of comparison with the birefringence measured using a method of this invention clearly shows stronger correlation than the results of comparison with the single PMD measurement. Hence the method of this invention is capable of accurate PMD measurement.

According to Non-patent Reference 4, when the PMD measurement precision is represented by the standard deviation a from the true value, then a is inversely proportional to the 1/2 power of the total PMD. Further, because the total PMD is proportional to the 1/2 power of the optical fiber length, $\sigma$ is inversely proportional to the 1/4 power of the optical fiber length. Hence, while in this embodiment 3000 m of optical fiber were used, if 1000 m of optical fiber were used the figure would be worsened by approximately 1.6 times; if 300 m were used, the figure would be worsened by approximately 1.8 times; and if 100 m were used, the figure would be worsened by approximately 2.3 times. Hence when a shorter optical fiber than in this embodiment was used to perform similar measurements, the correlation shown in FIG. 14 is expected to be a weaker correlation. On the other hand, because birefringence is not a statistical quantity, the measurement precision is not affected by the length of the optical fiber measured. Thus the method of this invention is particularly useful, compared with methods for direct PMD measurement of the prior art, when measuring the PMD of a short optical fiber with a comparatively small PMD.

Next, another PMD measurement method of this invention is described. As explained above, the PMD of optical fiber wound on a bobbin and the PMD when placed in the free state do not agree. However, in cases where the magnitude of the birefringence due to an external force applied from outside is small compared with the magnitude of the internal birefringence, or when the torsion applied to the optical fiber is small, the birefringence values of the optical fiber in the two states are nearly the same. In such cases, a relation exists between the birefringence of the optical fiber wound on the bobbin and the birefringence of the optical fiber placed in the free state; and the PMD of the optical fiber placed in the free state can be measured from the birefringence of the optical fiber wound on the bobbin.

In cases in which torsion or lateral pressure is applied after optical fiber solidification, the value of birefringence measured using a method of this invention is affected, and differs from the birefringence of the optical fiber placed in the free state; but when the entire optical fiber undergoes similar processes and is taken up on a bobbin, that is, in general manufacturing processes, the effect is substantially constant. Hence when the effect can be regarded as constant, a relation exists between the value of birefringence measured by a method of this invention in the state of being wound on a bobbin, and the value of the birefringence for the optical fiber placed in the free state. Consequently by measuring the birefringence of the optical fiber wound on a bobbin, the PMD of the optical fiber placed in the free state can be measured.

Next, twist applied to an optical fiber subjected to measurements while wound on a bobbin is discussed. In a birefringence measurement method of this invention, it is assumed that the infinitesimal interval (z, z+Δz) has only linear birefringence, and that the direction of the birefringent axis is also constant. In an optical fiber in the free state and in an optical fiber in an optical cable, the amount of twist is small, and so this assumption poses no problems. However, when a large twist is applied to an optical fiber wound on a bobbin due to the takeup process, there is an effect on the value of the birefringence measured using a method of this invention. This effect was computed using numerical calculations, and the range of applicability of methods of this invention was studied.

In calculations, the infinitesimal interval Δz was set to a length of 1 m, which is generally the resolution of OTDR. Calculation of the Jones matrix for the infinitesimal interval was performed by further dividing the infinitesimal interval into 0.001 m intervals, and rotating birefringent axis of adjacent intervals by the amount of twist. The Jones matrix for a 0.001 m interval was computed by multiplying the Jones matrix representing only the effect of rotatory power in the interval by the Jones matrix representing only the effect of linear birefringence in the interval. Waveguide dispersion and material dispersion of the optical fiber were not considered, and the light propagating in the optical fiber was approximated by a plane wave. The magnitude of the birefringence before twist application Δn was taken to be $1.55 \times 10^{-7}$, the rotatory power α to be 0.07, and the wavelength to be 1.55 μm. These are representative values for optical fibers and wavelengths widely used in current optical communication systems.

Figure 10:
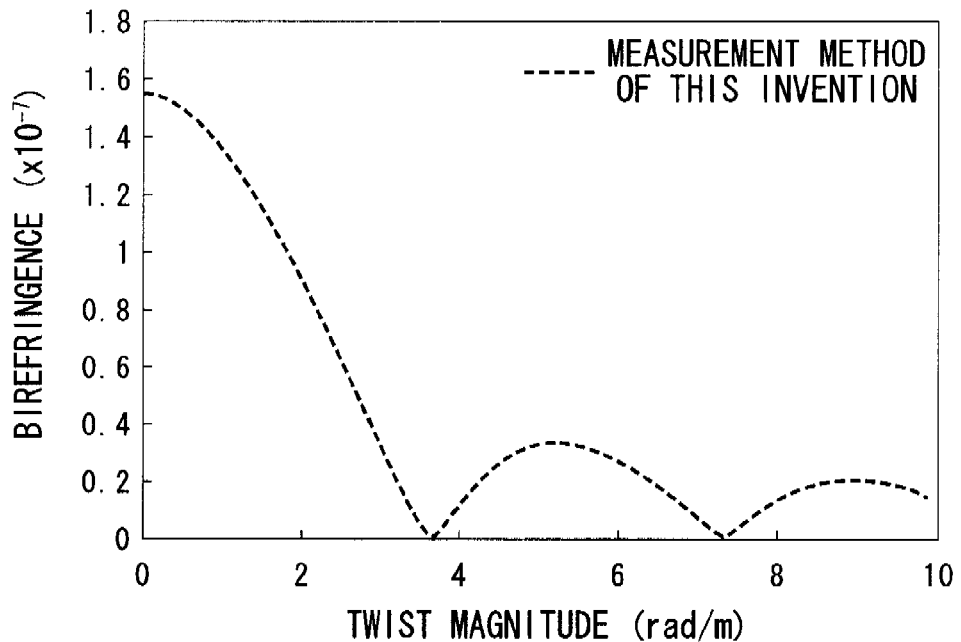
FIG. 10 shows an example of birefringence measured by a measurement method of this invention, when twist in one direction is applied after optical fiber solidification.

FIG. 10 shows the amount of change in the magnitude of the birefringence measured by a method of the invention, when the amount of twist was variously changed. From FIG. 10, if the amount of twist applied to the optical fiber was 1 rad/m, then the magnitude of the birefringence measured using a method of the invention matched the magnitude of the birefringence when there was no twist with a difference of approximately 10%. However, when the twist amount was 2 rad/m, the difference was approximately 40%. Hence it is preferable that the amount of twist applied to an optical fiber measured using a method of this invention to be 1 rad/m or less.

In recent years there have been cases in which a method has been used of effectively reducing the birefringence, by applying spin prior to solidification of the glass during drawing from molten glass of optical fiber and changing the birefringent axis direction, to reduce the optical fiber PMD. The effective birefringence magnitude Δn' in the infinitesimal interval can be determined from the phase difference φ occurring between two orthogonal intrinsic polarizations which are intrinsic to the infinitesimal interval, and after diagonalizing the Jones matrix for the infinitesimal interval to equation (14), $$J_2 = P_2 Q_2 P_2^{-1} \quad (14)$$
$$= P_2 \cdot \begin{bmatrix} \exp(+\phi/2) & 0 \\ 0 & \exp(-\phi/2) \end{bmatrix} \cdot P_2^{-1}$$

Δn' can be computed from the following equations (15) and (16).

$$\phi = \frac{\arg\left(\frac{\rho_1}{\rho_2}\right)}{2} \quad (15)$$

$$\Delta n' = \frac{\lambda \phi}{2\pi \cdot \Delta z} \quad (16)$$

In this case also, the birefringent axis direction in the infinitesimal interval Δz is not constant, and so may affect the value of birefringence measured using a method of this invention. This effect was computed using numerical calculations, to study the range of applicability of methods of this invention. The calculation conditions were the same.

Figure 11:
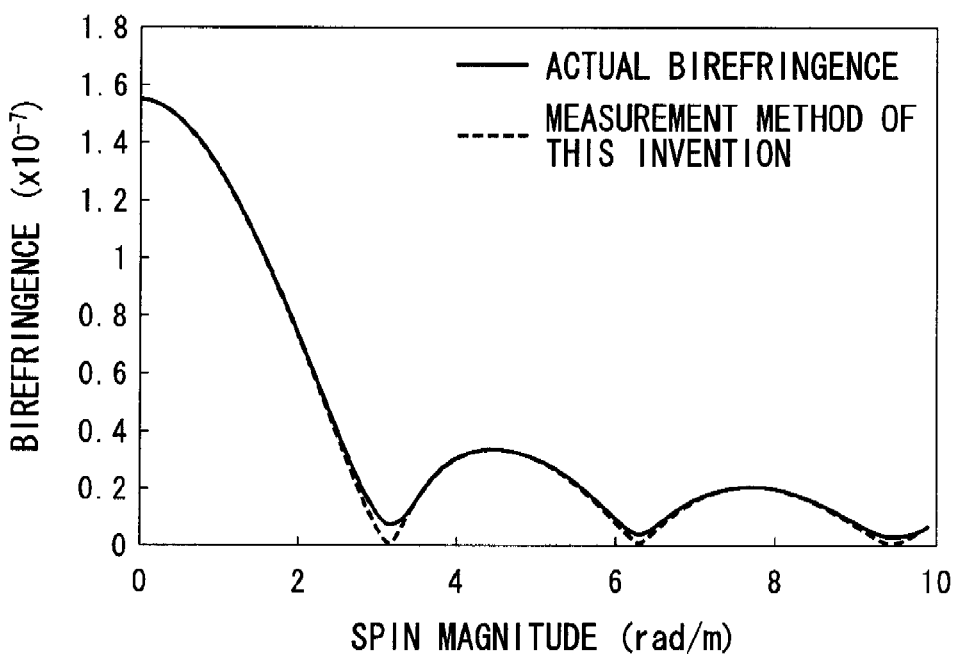
FIG. 11 shows an example of actual birefringence and of birefringence measured by a measurement method of this invention, when twist in one direction is applied before optical fiber solidification.

First, FIG. 11 shows the calculated differences occurring in the magnitude of the effective birefringence in the interval Δz and in the magnitude of birefringence measured by a method of this invention, when spin is applied in a constant direction before optical fiber solidification, and the amount of applied spin is varied.

Figure 12:
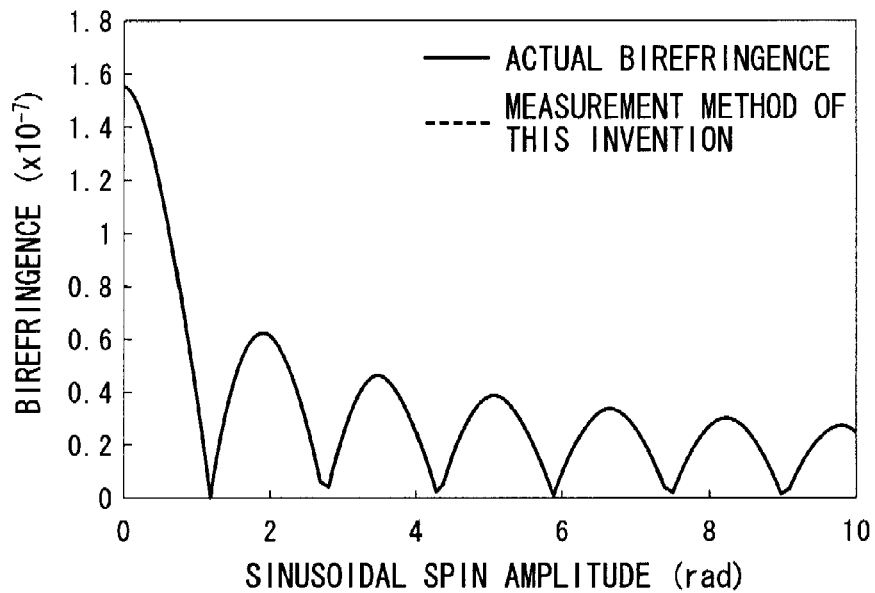
FIG. 12 shows an example of actual birefringence and of birefringence measured by a measurement method of this invention, when sinusoidal spin is applied before optical fiber solidification.

FIG. 12 shows the results of similar calculations for cases in which sinusoidal spin is applied before optical fiber solidification. Sinusoidal spin is a method of application of spin such that the following equation (17)

$$\theta(z) = A \cdot \sin\left(\frac{2\pi}{P} \cdot z\right) \quad (17)$$

obtains between the spin angle θ at a point at a distance z, the spin amplitude A, and the spin period P.

From FIG. 11 and FIG. 12, it is seen that even when spin is applied in a constant direction before optical fiber solidification, and even when sinusoidal spin is applied before optical fiber solidification, the magnitude of birefringence measured by a method of this invention agrees well with the effective birefringence magnitude. Hence when the effective birefringence is lowered by applying spin before optical fiber solidification, a method of this invention can be used for accurate measurement of birefringence.

Figure 15:
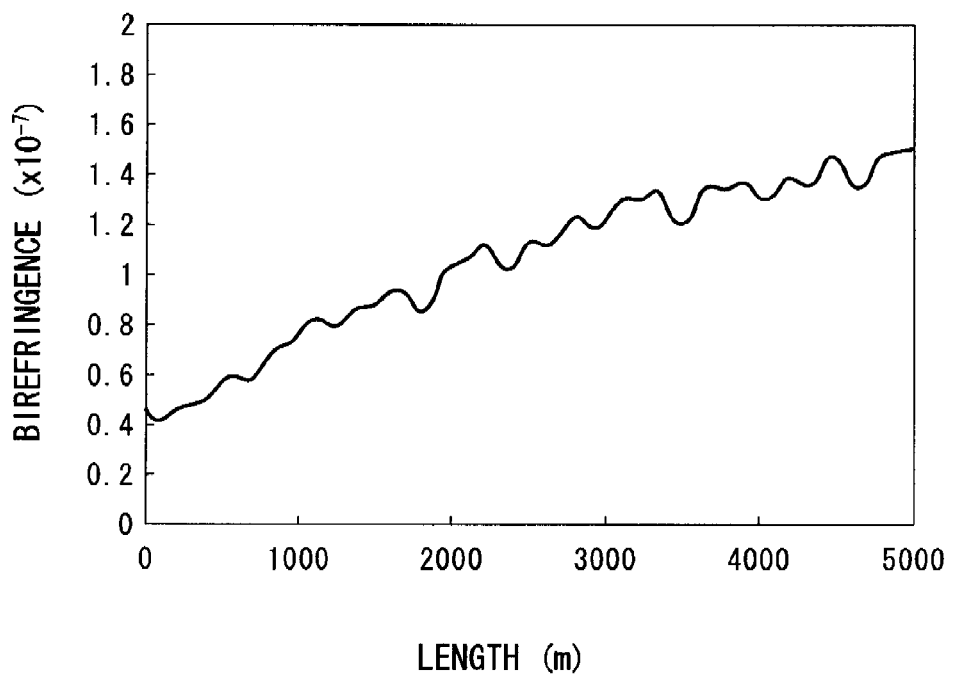
FIG. 15 shows an example of longitudinal measurement of the birefringence of an optical fiber wound around a bobbin.

Next, another PMD measurement method of this invention is explained. If the effect of an external force applied to the optical fiber for measurement by the bobbin is small, a method of this invention can be used to measure the PMD of the optical fiber placed in the free state, but when the tension of takeup onto the bobbin is high, there is an effect of lateral pressure due to the tension, and there are cases in which it is difficult to reduce the effect on birefringence of the external force applied across the entire length of the optical fiber for measurement. FIG. 15 shows the results of longitudinal measurement, from the outermost periphery, of the beat length of optical fiber wound around a bobbin. From FIG. 15, it is seen that in the state of being wound around the bobbin, the further toward the inner periphery, the larger is the birefringence.

On the other hand, the birefringence of an optical fiber is frequently due to the preform of the optical fiber; if the preform is the same, often the magnitude of the birefringence is substantially the same. In such cases, such locations that the effect on the birefringence due to the applied external force is small, the birefringence in the vicinity of the outermost periphery of the wound optical fiber can usually be measured and taken as a representative value of the birefringence for the optical fiber for measurement, and used to measure the PMD of the optical fiber placed in the free state.

Figure 16:
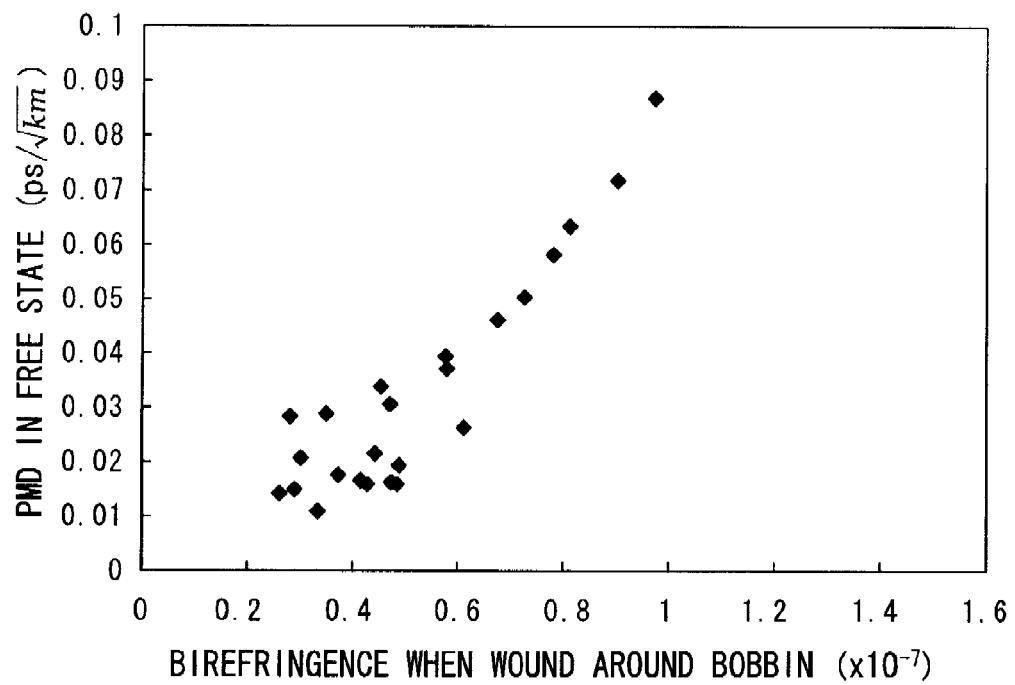
FIG. 16 shows an example of longitudinal measurement of the birefringence of an optical fiber wound around a bobbin.

FIG. 16 compares the birefringence actually measured over an interval of 500 m from the outermost periphery in the state of being wound on a bobbin with the PMD measured when the entire optical fiber wound on the bobbin was placed in the free state. From FIG. 16 it is seen that by measuring the birefringence of the outer peripheral portion while in the state of being wound on the bobbin, the result can be used as a representative value of the PMD when the entire optical fiber wound on the bobbin is placed in the free state.

Next, the form of bobbins for which use of the methods of this invention are suited is discussed. If the effect of external force applied by the bobbin to the optical fiber for measurement is small, then when the above method is used to measure the PMD of an optical fiber placed on the free state, measurements can be performed over a longer distance from the outer peripheral portion. To this end, it is preferable that a cushion material be placed at locations at which the bobbin and the optical fiber for measurement make contact, to reduce the effect of external force applied to the optical fiber for measurement. One perturbing factor acting on an optical fiber for measurement during measurements is the perturbations due to changes in lateral pressure applied to the fiber when the bobbin around which the optical fiber is wound expands or contracts due to changes in temperature; it is preferable that cushion material be used to prevent the application of perturbations to the optical fiber for measurement even when expansion or contraction of the bobbin occurs.

Further, it is preferable that the bobbin be configured so as to enable temporary removal of tension on the optical fiber for measurement, and that a measurement method be used in which, having removed tension temporarily from the optical fiber during measurements, after measuring the PMD using a method of this invention, the tension is returned to the original state. This method is particularly effective when the bobbin takeup tension is high, and the birefringence arising from winding onto the bobbin is high.

Next, a method of longitudinal measurement of the PMD and birefringence of an optical fiber is described. Using a method of this invention, the birefringence can be determined longitudinally along an optical fiber, and so using the relation between birefringence and PMD described above, the PMD can be measured longitudinally.

Figure 17:
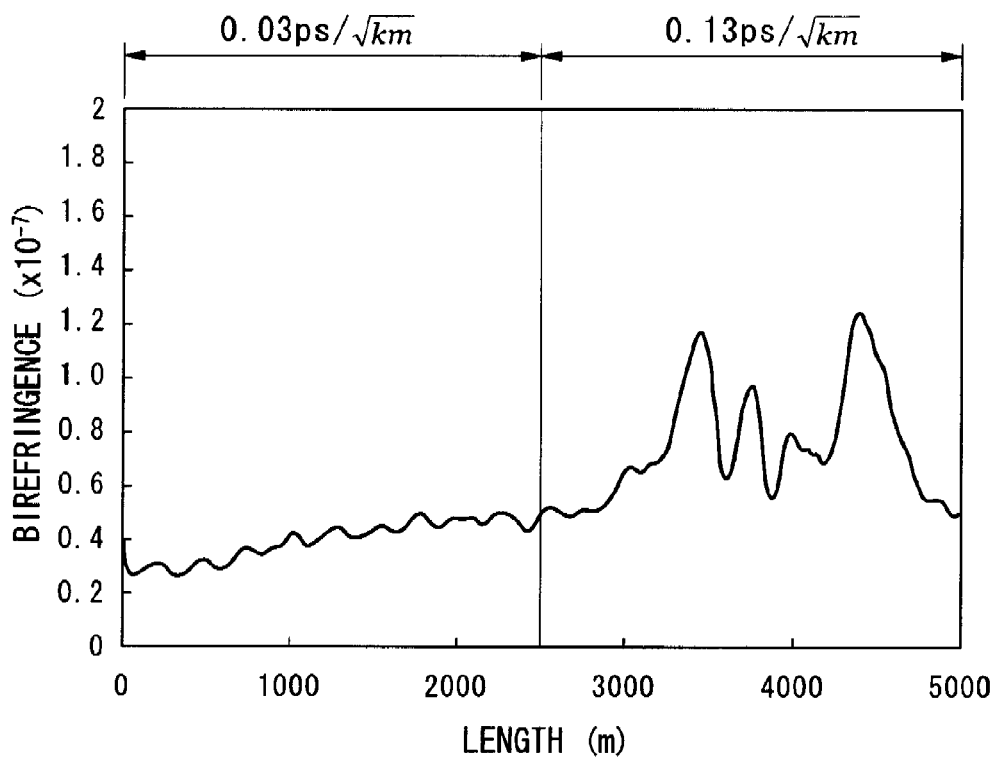
FIG. 17 shows the relation between the longitudinal birefringence distribution, measured with the optical fiber in the state of being wound around a bobbin, and the PMD when the optical fiber is divided in two at the center and placed in the free state.

FIG. 17 compares the results when an optical fiber of total length 5000 m, drawn from molten glass such that circularity of the optical fiber was partially worsened, and in a state of being wound on a bobbin, was subjected to longitudinal birefringence measurements by a method of this invention, and was then divided in two at the 2500 m point and subjected to PMD measurements in the free state. From FIG. 17, it is seen that by using a method of this invention, the PMD in the free state in the length direction can be measured longitudinally even when the optical fiber is wound on a bobbin.

Further, it is preferable that a configuration be adopted in which cushion material is placed in locations at which the bobbin and the optical fiber for measurement make contact or the tension on the optical fiber for measurement due to the bobbin be temporarily removed, and that, with the tension on the optical fiber temporarily removed during measurements, that the PMD be measured in the length direction by a method of this invention, enabling detection of longitudinal PMD fluctuations with extremely high precision.

Figure 18:
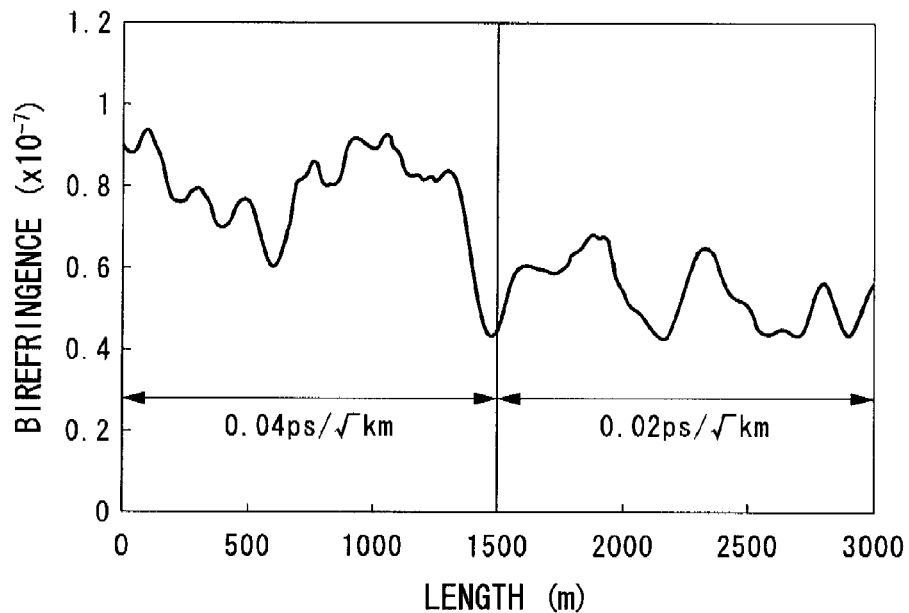
FIG. 18 shows the relation between the longitudinal birefringence distribution, measured with the optical fiber wound around a bobbin configured for temporary relaxation of tension, in a state of relaxed tension, and the PMD when the optical fiber is divided in two at the center and placed in the free state.

FIG. 18 compares the results when an optical fiber of total length 3000 m, drawn from molten glass such that circularity of the optical fiber was partially worsened, was wound onto a bobbin configured to enable temporary removal of tension on the optical fiber for measurement, after which tension was temporarily removed and the longitudinal birefringence was measured by a method of this invention, following which the fiber was divided in two at the 1500 m point, and PMD measurements were performed in the free state. From FIG. 18, it is seen that by using a method of this invention, even extremely small longitudinal PMD changes can be detected.

This invention provides an optical fiber the polarization mode dispersion of which, as measured by the above-described optical fiber polarization mode dispersion measurement method, is 0.1 ps/$\sqrt{km}$ or less. An optical fiber of this invention may be a quartz glass single-mode optical fiber (hereafter "SM fiber") or a polarization-maintaining optical fiber or similar, but is not limited to these.

An optical fiber of this invention can be provided in a state of being wound on a bobbin; it is preferable that, in the state of being wound on a bobbin, the amount of torsion applied be 1 rad/m or less. If the torsion amount is 1 rad/m or less, then the birefringence measured in the state of being wound around the bobbin agrees with the magnitude of the birefringence when there is no twist with a difference of approximately 10%, and so the birefringence of the optical fiber can be measured in the state of being wound around a bobbin. On the other hand, in cases in which the twist amount exceeds 1 rad/m, and the twist amounts are different for each optical fiber, the relation between the measured birefringence and the PMD of the optical fiber placed in the free state is weakened, and the PMD cannot be accurately measured.

It is preferable that the optical fiber of this invention display, either on the optical fiber itself or on the bobbin on which it is wound, the PMD value measured using the above-described PMD measurement method of this invention or the upper limit thereof. It is preferable that the displayed contents be, for example, "PMD 0.01 to 0.05 ps/$\sqrt{km}$", "PMD 0.1 ps/$\sqrt{km}$ or less", or similar. Display may be accomplished by affixing a label on which are printed the display contents, by attaching a tag with the display, or similar. The PMD value or upper limit may also be printed on an explanatory document listing the performance of the optical fiber, and this document may be packed or packaged with the optical fiber wound on the bobbin.

Optical fibers of various lengths, wound around a bobbin of diameter 300 mm under a tension of 40 g, were in this state subjected to birefringence measurements over a 1300 m interval from the outermost periphery. Then, this 1300 m was placed in the free state, and both the birefringence and the PMD were measured ten times each. Vibrations were applied to the optical fibers upon each measurement (as described in IEC 60793-1-48, Annex E).

Figure 19:
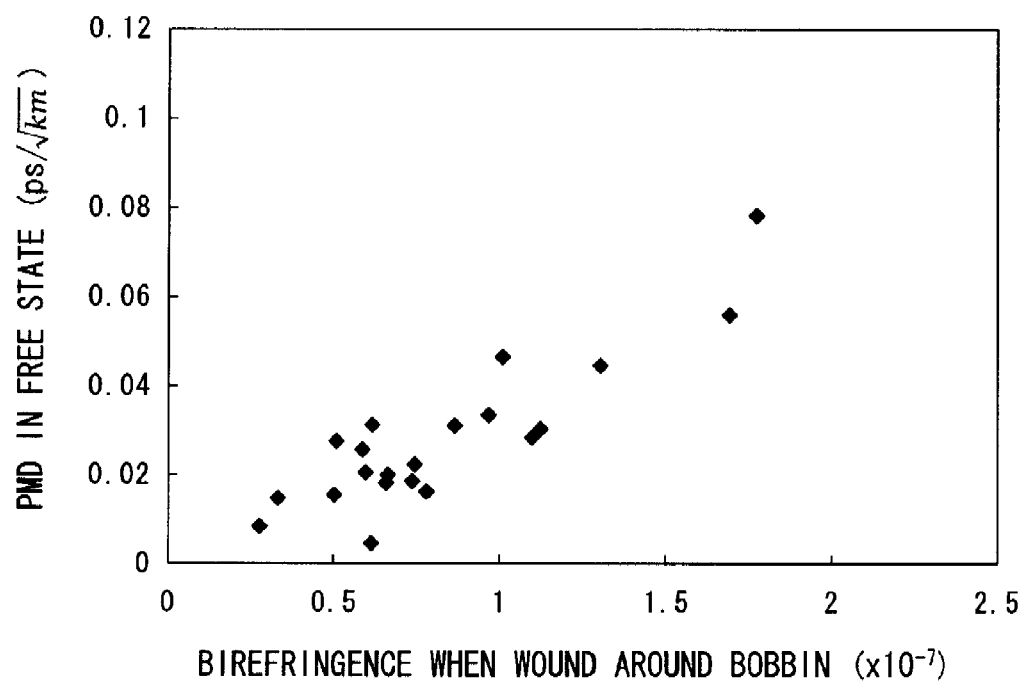
FIG. 19 is a graph showing the result of comparison of the birefringence in the state of being wound around a bobbin, and the PMD of the optical fiber placed in the free state.

The results of comparison of the birefringence in the state of being wrapped around a bobbin, and the PMD of the optical fiber placed in the free state, appear in FIG. 19. In FIG. 19, the PMD measurement results are averages of ten measurements. From FIG. 19 it is seen that by measuring the birefringence in the state of being wound around a bobbin, the PMD of the optical fiber placed in the free state can be measured.

Figure 20:
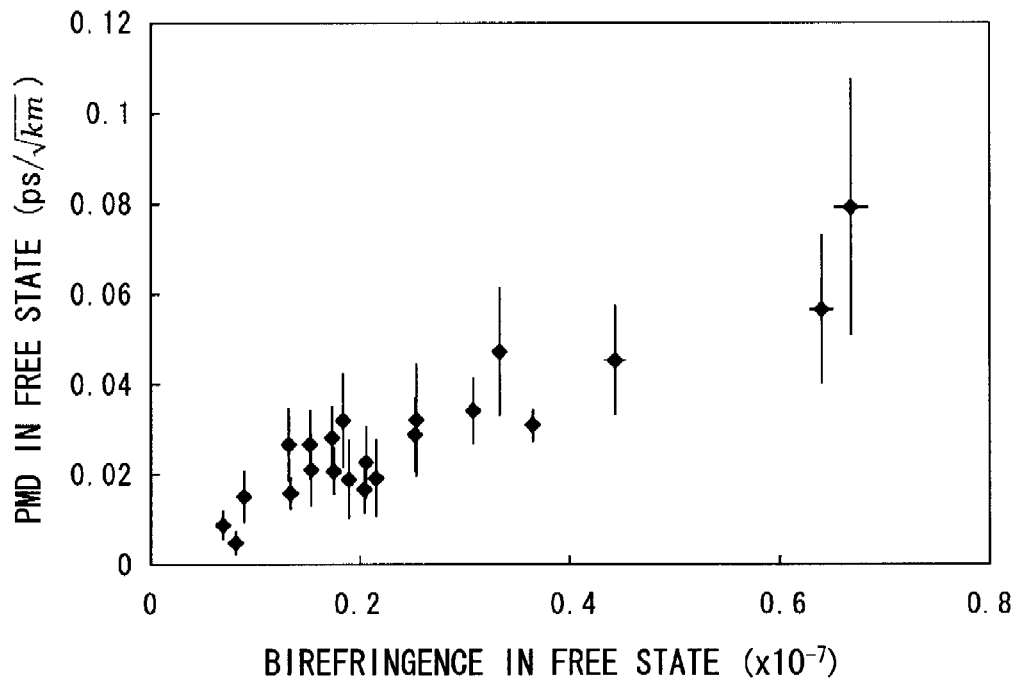
FIG. 20 is a graph showing the result of comparison of the birefringence of an optical fiber placed in the free state, and the PMD of the optical fiber placed in the free state; and, FIG. 21 is a graph showing the result of comparison of the birefringence in the state of being wound around a bobbin, and the birefringence of the optical fiber placed in the free state.

FIG. 20 shows the results of comparison of the birefringence of an optical fiber placed in the free state, and the PMD of the optical fiber placed in the free state. The points in FIG. 20 are averages of ten measurement results for each measurement; error bars indicate the standard deviation. From FIG. 20, by measuring the birefringence when placed in the free state, the PMD of the optical fiber placed in the free state can be measured. It is seen that the standard deviation of birefringence measurements is extremely small compared with the standard deviation of PMD measurements. Hence it is seen that the PMD measurement method of this invention has extremely good measurement reproducibility.

Figure 21:
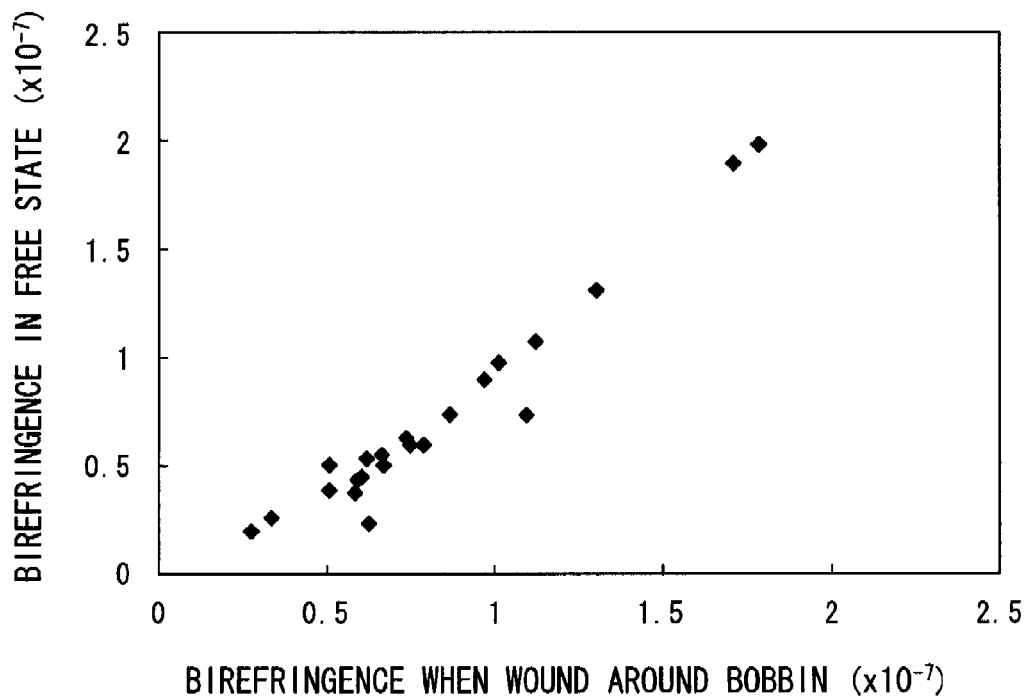

FIG. 21 shows the results of comparison of birefringence when in the state of being wound around a bobbin, and the birefringence of the optical fiber placed in the free state. From FIG. 21 it is seen that even in the state of being wound around a bobbin, the state of birefringence is unchanged from the case of being placed in the free state, so that this method is suitable for measurement of optical fiber wound around a bobbin. The measured values of the birefringence are equal for the state of being wound around a bobbin and for the free state because no torsion occurs when winding around the bobbin, or, the effect on the birefringence due to the bobbin bending radius and lateral pressure is very small.

What is claimed is:

1. A method of measuring the birefringence of an optical fiber, the method comprising:
    acquiring the round-trip Jones matrix R(z) for a first interval (0,z) from a measurement starting point 0 in the optical fiber to a prescribed position z, and
    acquiring the round-trip Jones matrix R(z+Δz) for a second interval (0,z+Δz) from said measurement starting point 0 to a position z+Δz differing from said position z,
    determining the eigenvalues $\rho_1$, $\rho_2$ of the matrix R(z+Δz) R(z)$^{-1}$, and
    obtaining the birefringence in the infinitesimal interval Δz from said position z to said position z+Δz by computing the following equations (1) and (2), $$\phi = \frac{\arg\left(\frac{\rho_1}{\rho_2}\right)}{2} \quad (1)$$

$$\Delta n = \frac{\lambda \phi}{2\pi \cdot \Delta z} \quad (2)$$

wherein φ represents the phase difference between linear polarization components due to birefringence, Δn represents birefringence, and λ represents wavelength.

2. The optical fiber birefringence measurement method according to claim 1, wherein a polarization optical time domain reflectometer (OTDR) is used to acquire the round-trip Jones matrices of the optical fiber.

3. An optical fiber birefringence measurement device, comprising:
    timing control means;
    pulse light generation means, controlled by the timing control means;
    polarization conversion means which converts a polarization state of pulse light from the pulse light generation means;
    optical recirculation means which inputs pulse light from the polarization conversion means to one end of the optical fiber, and which outputs backscattered light returning to the one end of the optical fiber;
    polarization detection means, controlled by the timing control means, which detects the polarization state of light output from the optical recirculation means as a time series; and
    analysis means which, based on the output of the polarization detection means, uses the birefringence measurement method of claim 1 or claim 2 to measure the birefringence of the optical fiber.

4. An optical fiber polarization mode dispersion measurement method, comprising:
    measuring the birefringence of the optical fiber in a free state using the optical fiber birefringence measurement method of claim 1 or claim 2, and
    calculating the polarization mode dispersion of the optical fiber in the free state based on the measured birefringence of the optical fiber and a relationship between the birefringence and the polarization mode dispersion.

5. The optical fiber polarization mode dispersion measurement method according to claim 4, further comprising:
    extracting a portion of an optical fiber wound around a bobbin; wherein:
    the measuring of the birefringence of the optical fiber comprises measuring the birefringence of the of the extracted portion of the optical fiber,
    the calculating of the polarization mode dispersion of the optical fiber is based on the measured birefringence of the extracted portion of the optical fiber and the relationship between the birefringence and the polarization mode dispersion, and
    the measured polarization mode dispersion is the polarization mode dispersion when the entire optical fiber wound around the bobbin is placed in the free state.

6. An optical fiber polarization mode dispersion measurement method, comprising:
    determining the birefringence of the optical fiber in a free state using the optical fiber birefringence measurement method of claim 1 or claim 2, and
    calculating the polarization mode dispersion of the optical fiber in the free state while the optical fiber is in a state of being wound around a bobbin based on the determined birefringence of the optical fiber and a relationship between the birefringence and the polarization mode dispersion.

7. An optical fiber polarization mode dispersion measurement method, comprising:
    determining the birefringence of the optical fiber in a state of being wound on a bobbin using the optical fiber birefringence measurement method of claim 1 or claim 2, and
    calculating the polarization mode dispersion of the optical fiber in the free state while the optical fiber is in the state of being wound around a bobbin based on the determined birefringence of the optical fiber and a relationship between the birefringence and the polarization mode dispersion.

8. The optical fiber polarization mode dispersion measurement method according to claim 6, wherein the amount of torsion applied to the optical fiber in the state of being wound around a bobbin is 1 rad/m or less.

9. The optical fiber polarization mode dispersion measurement method according to claim 7, wherein the amount of torsion applied to the optical fiber in the state of being wound around a bobbin is 1 rad/m or less.

10. The optical fiber polarization mode dispersion measurement method according to claim 6, wherein:
    the determining of the birefringence of the optical fiber comprises measuring the birefringence of a portion of the optical fiber for which the magnitude of the birefringence due to an external force is smaller than the magnitude of the internal birefringence; and
    the calculating of the polarization mode dispersion of the optical fiber in the free state is based on the determined birefringence of the portion of the portion of the optical fiber and the relationship between the birefringence and the polarization mode dispersion.

11. The optical fiber polarization mode dispersion measurement method according to claim 7, wherein:
    the determining of the birefringence of the optical fiber comprises measuring the birefringence of a portion of the optical fiber for which the magnitude of the birefringence due to an external force is smaller than the magnitude of the internal birefringence; and the calculating of the polarization mode dispersion of the optical fiber in the free state is based on the determined birefringence of the portion of the portion of the optical fiber and the relationship between the birefringence and the polarization mode dispersion.

12. The optical fiber polarization mode dispersion measurement method according to claim 6, wherein the determining of the birefringence of the optical fiber further comprises placing cushion material at locations at which the bobbin makes contact with the optical fiber, thus reducing the lateral pressure on the optical fiber, and substantially eliminating the effects of polarization state fluctuations during measurements due to expansion and contraction of the bobbin due to temperature changes in the measurement environment.

13. The optical fiber polarization mode dispersion measurement method according to claim 7, wherein the determining of the birefringence of the optical fiber further comprises placing cushion material at locations at which the bobbin makes contact with the optical fiber, thus reducing the lateral pressure on the optical fiber, and substantially eliminating the effects of polarization state fluctuations during measurements due to expansion and contraction of the bobbin due to temperature changes in the measurement environment.

14. The optical fiber polarization mode dispersion measurement method according to claim 6, further comprising:
prior to the determining of the birefringence of the optical fiber, temporarily relaxing a tension on the optical fiber.

15. The optical fiber polarization mode dispersion measurement method according to claim 7, further comprising:
prior to the determining of the birefringence of the optical fiber, temporarily relaxing a tension on the optical fiber.

16. The optical fiber polarization mode dispersion measurement method according to claim 6, further comprising displaying the measured polarization mode dispersion value or the upper limit thereof.

17. The optical fiber polarization mode dispersion measurement method according to claim 7, further comprising displaying the measured polarization mode dispersion value or the upper limit thereof.

* * * * *